(12) United States Patent
Meley et al.

(10) Patent No.: US 11,616,347 B2
(45) Date of Patent: Mar. 28, 2023

(54) CAM SELECTOR FOR AN EARTHING SWITCH

(71) Applicant: Schneider Electric Industries SAS, Rueil Malmaison (FR)

(72) Inventors: Jean-Pierre Meley, St Ismier (FR); Jerome Laye, Grenoble (FR); Emmanuel Frangin, Grenoble (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 90 days.

(21) Appl. No.: 15/796,990

(22) Filed: Oct. 30, 2017

(65) Prior Publication Data

US 2018/0138671 A1    May 17, 2018

(30) Foreign Application Priority Data

Nov. 14, 2016  (FR) ...................... 16 60981

(51) Int. Cl.
*H02B 11/133* (2006.01)
*H01H 9/28* (2006.01)
*H02B 11/28* (2006.01)
*H02B 11/167* (2006.01)
*H01H 9/22* (2006.01)
(Continued)

(52) U.S. Cl.
CPC ............ *H02B 11/133* (2013.01); *H01H 9/22* (2013.01); *H01H 9/282* (2013.01); *H01H 31/003* (2013.01); *H02B 11/167* (2013.01); *H02B 11/28* (2013.01); *H01H 9/281* (2013.01); *H01H 9/287* (2013.01); *H01H 2003/405* (2013.01)

(58) Field of Classification Search
CPC ..... H02B 11/133; H02B 11/28; H02B 11/167; H01H 9/22; H01H 31/003; H01H 9/282; H01H 9/287; H01H 2003/405; H01H 9/281; H01H 9/28; H01H 31/00; H01H 3/40
USPC ........................................ 200/50.23, 50.26
See application file for complete search history.

(56) References Cited

U.S. PATENT DOCUMENTS

| | | | |
|---|---|---|---|
| 2013/0186736 A1* | 7/2013 | Keim ....................... | H01H 3/02 |
| | | | 200/50.26 |
| 2017/0047179 A1* | 2/2017 | Cheng .................... | H01H 27/06 |
| 2018/0131165 A1* | 5/2018 | Yang ...................... | H01H 71/04 |

FOREIGN PATENT DOCUMENTS

| | | |
|---|---|---|
| DE | 10 2011 111 183 A1 | 2/2013 |
| EP | 1 032 006 A2 | 8/2000 |
| EP | 1 271 589 A1 | 1/2003 |

(Continued)

OTHER PUBLICATIONS

French Preliminary Search Report dated Jul. 11, 2017 in French Application 16 60981 filed Nov. 14, 2016 (with English Translation of Categories of Cited Documents).

*Primary Examiner* — Lheiren Mae A Caroc
(74) *Attorney, Agent, or Firm* — Oblon, McClelland, Maier & Neustadt, L.L.P.

(57) ABSTRACT

An operating modes selector is for an earthing switch that includes power contacts and a motor for moving the power contacts. The selector includes a plurality of positions corresponding respectively to various operating modes of the earthing switch, and includes cams whose positions are defined by the selector position. The selector contains a first cam which pulls a first locking organ designed to mechanically block the motor of the earthing switch when the selector is in a position corresponding to a locked closed mode wherein the earthing switch is closed.

8 Claims, 5 Drawing Sheets

(51) Int. Cl.
  *H01H 31/00* (2006.01)
  *H01H 3/40* (2006.01)

(56) References Cited

FOREIGN PATENT DOCUMENTS

| WO | 2011/023205 | 3/2011 |
| WO | 2013/097175 | 7/2013 |

* cited by examiner

CAM SELECTOR FOR AN EARTHING SWITCH

TECHNICAL FIELD

The present invention relates to earthing switches employed in high-voltage cubicles, and more specifically to the control thereof. In this context, the term "switch" also encompasses disconnectors and disconnector switches. In this context, the term "high voltage" encompasses the medium- and high-voltage ranges, i.e. a voltage in excess of 1,000 V.

In the present context, the invention relates to a motorized operating mode selector, which is designed for an earthing switch.

The invention applies specifically to air-insulated cubicles, i.e. of the AIS type (Air Insulated Switchgear). It also applies to gas-insulated cubicles, i.e. of the GIS type (Gas Insulated Switchgear).

PRIOR ART

In general, a high-voltage cubicle of this type comprises a plug-in electrical device, which is arranged to move on a truck, such that it can be connected to or disconnected from the high-voltage cubicle. The truck may be motorized. The electrical device is generally a circuit-breaker, but may also be a contactor, a contactor/circuit-breaker or a fuse contactor.

An earthing switch is a safety device, which is employed in high-voltage cubicles for the execution of maintenance operations in the interior of the cubicles, or upon the cables connected thereto. It comprises a control system acting upon power contacts, which effect the earthing of cables when they are closed. The actuation of a switch can only be executed under certain conditions, and the control system incorporates interlocking functions with local or remote components, such as the plug-in circuit-breaker of the cubicle, an access door to cables, and up-circuit or down-circuit devices. The earthing switch is conventionally actuated manually by the operator from the front surface of the cubicle, by means of a crank wheel. Interlocking functions are essentially mechanical, and are delivered by physical connections, such as translational or rotary cranks, or by means of keys. Moreover, the use of padlocks permits the switch to be locked in a given state, whether open or closed, thereby ensuring the safety of the operator.

In the majority of existing forms of embodiment, the control system comprises a multi-position rotary or linear selector. The movement of the selector is possible under certain conditions of mechanical locking. The movement of the selector permits the insertion of the crank wheel required for the actuation of the switch and, in itself, executes certain mechanical interlocking functions. Locking-out is generally achieved by the padlocking of the selector.

It is increasingly commonplace for earthing switches to be motorized, in order to permit remote control and to remove the operator from the cubicle. Accordingly, the operator is not exposed to any internal arc which might be generated on the interior of the cubicle upon the closing of the power contacts.

According to the current prior art, motorization is achieved by the addition to a manual switch of a motor and an electrical interlocking system. For example, there is provision for the switch motor control circuit to incorporate an auxiliary positional contact for the circuit-breaker, which prevents the operation of the motor when the circuit-breaker is plugged-in (i.e. connected).

However, the superimposition of manual operation and motorized operation introduces an element of functional complexity associated with the interaction of these two forms of operation. Specifically, in existing embodiments, the following functions are not considered, or are only considered to a partial extent:

In motorized operation, the maintenance in force of all initial mechanical interlocking functions, over and above electrical interlocking functions.

The interlocking of motorized and manual operation (prohibition of manual access during motorized operation, and vice versa).

Under lock-out conditions, maintenance in force of the mechanical locking of the motor, in order to ensure the non-operation of the switch in the event of a remote electrical command and the failure of the electrical interlocking system (for example, in case of the fusion of the auxiliary contacts).

PRESENTATION OF THE INVENTION

The invention is intended to resolve the problems associated with the prior art by the disclosure of a control system for a motorized earthing switch in different operating modes, described as an operating mode selector, which permits the delivery of all mechanical and electrical interlocking functions, together with the consideration of interactions associated with different modes of operation, and a lock-out function with mechanical locking of the motor.

The invention thus relates to an operating mode selector of an earthing switch, the earthing switch comprising power contacts and a motor for the actuation of the power contacts, wherein the selector comprises a plurality of positions, corresponding respectively to different operating modes of the earthing switch, and comprising cams, the position of which is defined by a position of the selector, characterized in that the selector comprises a first cam which drives a first locking organ, which is designed to mechanically block the motor of the earthing switch when the selector is in a position, of the plurality of positions, which corresponds to a locked closed mode, wherein the earthing switch is closed.

The invention resolves the problems of interaction between the manual and automatic operating modes of a motorized earthing switch.

The invention permits the enhancement of the safety of property and persons, by the deployment of mechanical safety functions in addition to electrical safety functions.

Specifically, the invention takes accounts of modes of failure including the following:

fusion of the power contacts of the earthing switch associated with the passage of an excessive current, or the failure of the control shaft, which might result in the non-opening of the earthing switch, fusion of the auxiliary contacts of the motor control circuit, which might result in the spurious opening of the earthing switch.

According to a preferred characteristic, the operating mode selector of an earthing switch, comprising a worm screw which is driven in rotation by the motor and a nut which is driven by the worm screw when the motor drives said worm screw, wherein the nut is connected to a control shaft to initiate the movement of the power contacts of the switch, and wherein the switch is designed to be installed in a cubicle comprising a plug-in electrical device mounted on a truck. The operating mode selector further comprises a first lever which is driven by the nut of the worm screw, such that the first lever acts on a second locking organ so that it is mechanically capable to block the truck of the electrical device in an unplugged position when the nut moves to the closed position of the switch, where the selector is in a position, of the plurality of positions, corresponding to an automatic mode, in which the switch is actuated by means of the motor.

According to a preferred characteristic, the operating mode selector of an earthing switch further comprises a second cam, which drives the second locking organ for the mechanical blocking of the truck of the electrical device in an unplugged position, where the selector is in a position, of the plurality of positions, corresponding to a manual mode, in which the manual actuation of the switch by an operator is possible.

According to a preferred characteristic, the operating mode selector of an earthing switch, comprising a status feedback shaft for the actual position of the power contacts of the switch, further comprises a second lever, such that the status feedback shaft, via the second lever, maintains the second locking organ in position, which mechanically blocks the truck of the electrical device in the unplugged position, provided that the power contacts of the earthing switch are in the closed position.

According to a preferred characteristic, the operating mode selector of an earthing switch comprises a third cam, which acts on auxiliary electrical contacts in order to establish the electric power supply to the motor in automatic mode, and to interrupt the electric power supply to the motor in other modes.

According to a preferred characteristic, in a locked open mode, in which the earthing switch is open, the second locking organ permits the movement of the truck of the electrical device.

According to a preferred characteristic, the operating mode selector of an earthing switch comprises a fourth cam acting on a third locking organ in order to unlock an access door to cables, in the case of the locked closed mode, and to lock the access door to cables otherwise.

According to a preferred characteristic, the operating mode selector of an earthing switch comprises a rod which blocks the selector in the locked closed mode, if the access door to cables is not closed.

According to a preferred characteristic, the operating mode selector of an earthing switch comprises a fifth cam and a status feedback shaft for the position of the power contacts, in order to prohibit access to the locked open mode, in which the earthing switch is open, and to the locked closed mode, if the corresponding position of the power contacts of the switch is not achieved.

According to a preferred characteristic, the operating mode selector of an earthing switch comprises a key-operated, padlock-operated or coil-operated blocking system, in the locked closed and locked open modes of the earthing switch.

The invention also relates to an earthing switch, characterized in that it comprises an operating mode selector of the type described above.

The earthing switch has advantages which are analogous to those described above.

BRIEF DESCRIPTION OF THE DRAWINGS

Further characteristics and advantages will become apparent on reading the following description of a preferred form of embodiment, which is provided by way of example and not by way of limitation, described with reference to the figures, in which.

DETAILED DESCRIPTION OF SPECIFIC FORMS OF EMBODIMENT

Figure 1:
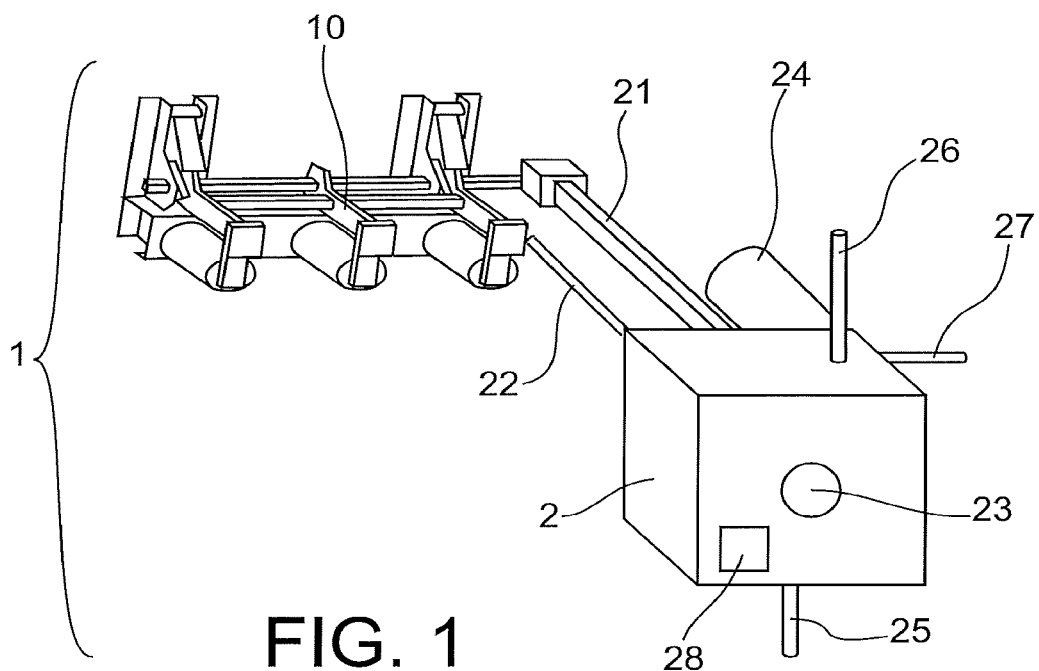
FIG. 1 represents an earthing switch, equipped with an operating mode selector, according to one form of embodiment of the present invention.
Figure 2A:
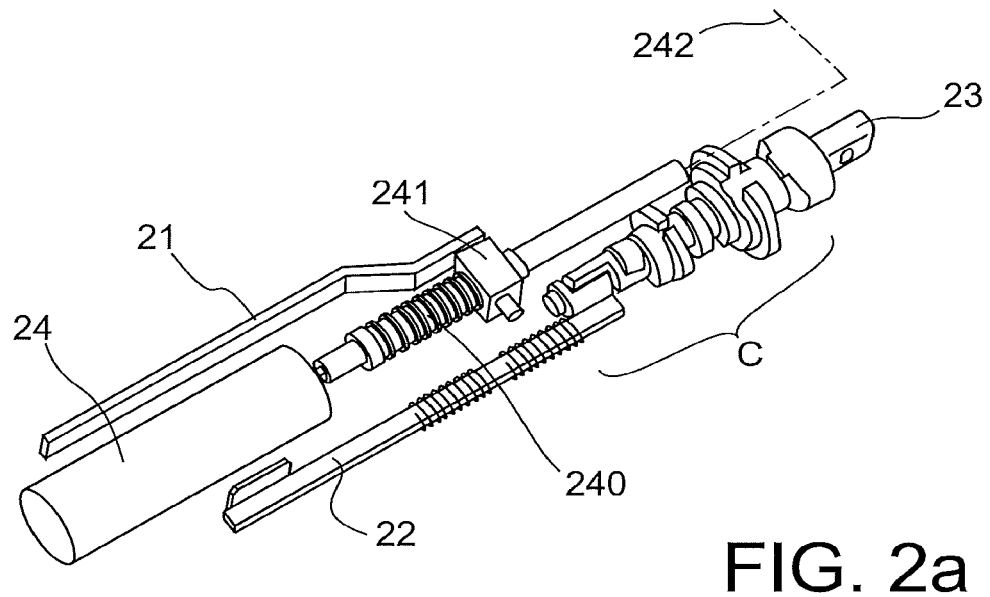
FIGS. 2a, 2b, 2c, 2d represent perspective views of elements of the operating mode selector, relating to the kinematic power and control chains of the earthing switch, according to one form of embodiment of the present invention.
Figure 2B:
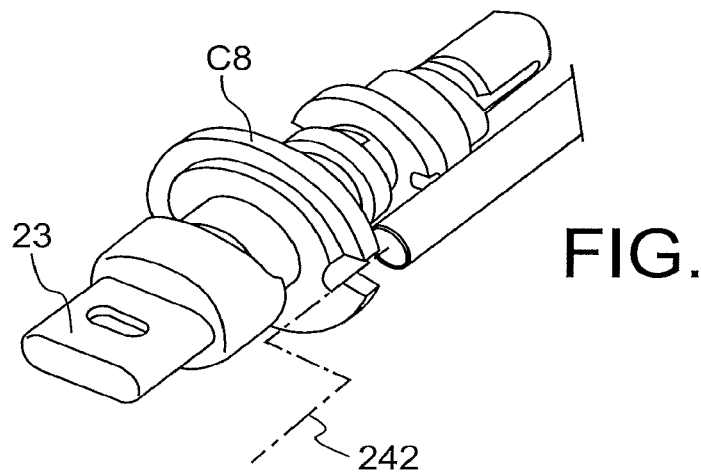
Figure 2C:
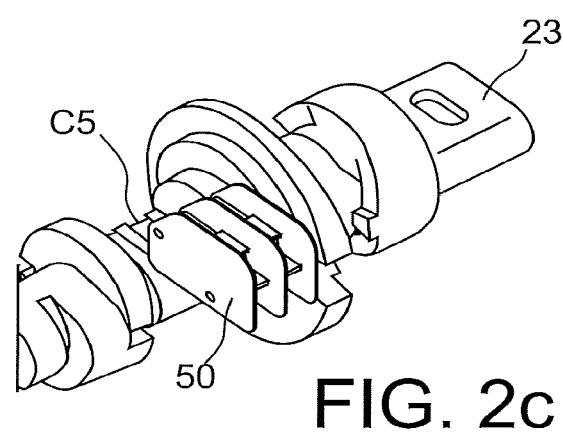
Figure 2D:
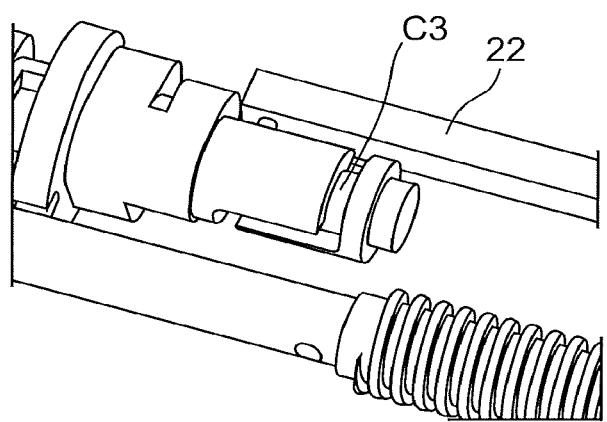

According to a preferred form of embodiment, represented in FIG. 1, an earthing switch 1 is equipped with an operating mode selector 2. The switch 1 is designed for fitting to a high-voltage cubicle, which is conventional per se and is not represented. The high-voltage cubicle specifically comprises a plug-in electrical device of the circuit-breaker type, mounted on a truck, and a compartment accommodating high-voltage cables.

The switch 1 comprises primary power contacts 10, situated in the aforedescribed compartment, the closing of which executes the earthing of the high-voltage cables. Thus, in the "closed" position, the power contacts 10 connect the high-voltage cables to earth whereas, in the "open" position, the high-voltage cables are disconnected from earth. The switch is of the motorized type, and comprises a motor 24.

The selector 2 controls the actuation of the power contacts 10 via a control shaft 21. A feedback shaft 22, connected to the power contacts 10 and free of any mechanical loading, communicates the exact position of the power contacts 10 of the switch to the selector 2. A positional indicator 28 situated on the front surface of the selector 2 permits the viewing of this position.

A control button 23 is arranged on the selector 2. The control button, for example, is of the rotary type and, according to its position, defines an operating mode of the earthing switch. Thus, as detailed hereinafter, it permits the insertion of a crank wheel on the front surface or the operation of the motor 24.

The cable compartment incorporates an access door. The selector 2 comprises a locking organ 25 for the door, to prevent the opening thereof.

The selector 2 further comprises a locking organ 26 for the truck of the plug-in circuit-breaker and a locking organ 27 for the motor 24 of the earthing switch.

It should be noted that, in FIG. 1, certain elements are represented schematically, specifically the organs 25, 26 and 27. These are represented more realistically in the subsequent figures.

The selector 2 has four positions, corresponding to four operating modes of the earthing switch 1:
- Automatic mode, which permits the actuation of the earthing switch using the motor. This is the normal operating mode of the earthing switch;
- Manual mode, which permits the actuation of the earthing switch by an operator, using a crank wheel;
- Locked open and locked closed modes, which permit the locking of the earthing switch in the open and closed positions respectively.

Operating modes are defined by the position of the control button 23.

According to one variant, the four-position rotary button 23 is replaced by a three-position button, which permits a selection between the "locked closed", "locked open" and "in-service" positions, associated, for example, with a control shutter, which permits a selection between the "manual" and "automatic" operating modes, when the three-position button is in the "in-service" position.

The functionalities of the earthing switch will now be described in detail.

In automatic mode, the earthing switch 1 is actuated electrically, thereby permitting remote control. Any manual actuation of the switch by an operator is not possible. Moreover, the opening of the door to the high-voltage cable compartment is not possible.

In manual mode, the motor of the earthing switch 1 is deactivated, and the insertion of the crank wheel is possible, thereby permitting manual actuation by the operator. Moreover, the opening of the door to the high-voltage cable compartment is not possible. The circuit-breaker truck is locked in the unplugged position. Manual mode will only be accessible if the circuit-breaker truck is in the unplugged position.

In the locked closed mode, which permits manual intervention on high-voltage cables, the motor of the earthing switch 1 is electrically deactivated and mechanically locked. Manual actuation of the switch by an operator is not possible. The opening of the door to the high-voltage cable compartment is possible. The circuit-breaker truck is locked in the unplugged position. The selector 2 can be locked-out by means of a key or a padlock on the front surface of the control unit, or locked-out electrically by means of a coil. This mode will only be accessible if the circuit-breaker truck is in the unplugged position, and the closed position of the power contacts 10 is genuinely achieved. Specifically, if the control shaft 21 fails in response to excessively high mechanical loading, the locked closed mode will not be accessible.

In the locked open mode, the motor of the earthing switch 1 is electrically deactivated, but is not mechanically locked. Manual actuation of the switch by an operator is not possible. The opening of the door to the high-voltage cable compartment is not possible. The movement of the circuit-breaker truck is possible. The selector 2 can be locked-out by means of a key or a padlock on the front surface of the control unit, or locked-out electrically by means of a coil. This mode will only be accessible if the open position of the power contacts 10 is genuinely achieved. Specifically, if the power contacts 10 are fused following the passage of an excessive current, the locked open mode will not be accessible.

FIGS. 2a, 2b, 2c and 2d represent perspective views of certain elements of the operating mode selector 2 of the earthing switch 1, according to one form of embodiment of the invention. More specifically, these figures illustrate the kinematic power and control chains of the earthing switch.

The button 23 on the selector drives the rotation of a system of cams C, the function of which is described hereinafter.

A worm screw 240 is driven in rotation by the motor 24 of the switch 1, or by a crank wheel 242, situated respectively at one of the ends of the worm screw. A nut 241 moves in translation on the worm screw, when the latter is driven in rotation.

The nut 241 is connected to the control shaft 21, such that the control shaft 21 moves in translation when the nut 241 moves on the worm screw 240. This causes the movement of the power contacts 10 of the earthing switch 1.

In manual mode, a cam C8 in the system of cams C (FIG. 2b) permits the insertion of the crank wheel 242 in a socket of the worm screw 240, and a cam C5 acts on auxiliary electrical contacts 50 (FIG. 2c) which interrupt the electric power supply circuit of the motor 24.

In automatic mode, the cam C8 prevents the access to the crank wheel 242, and the cam C5 re-establishes the electric power supply of the electric power supply circuit of the motor 24.

In locked open mode, the locking organ 26 permits the movement of the truck of the electrical device, and the cam C5 acts on the auxiliary electrical contacts 50 to interrupt the electric power supply to the motor.

The feedback shaft 22 is attached to the power contacts 10, and is moveable in translation, in order to communicate the actual position of the power contacts 10 of the switch 1 to the selector 2. It interacts with the button 23 by means of a cam C3 (FIG. 2d) which prohibits access to the locked closed and locked open modes, if the corresponding position is not achieved by the power contacts 10 of the switch. For example, if the power contacts 10 are fused, the locked open mode will not be accessible.

In the preferred form of embodiment, the worm screw 240, the control shaft 21 and the feedback shaft 22 are arranged in parallel.

Figure 3:
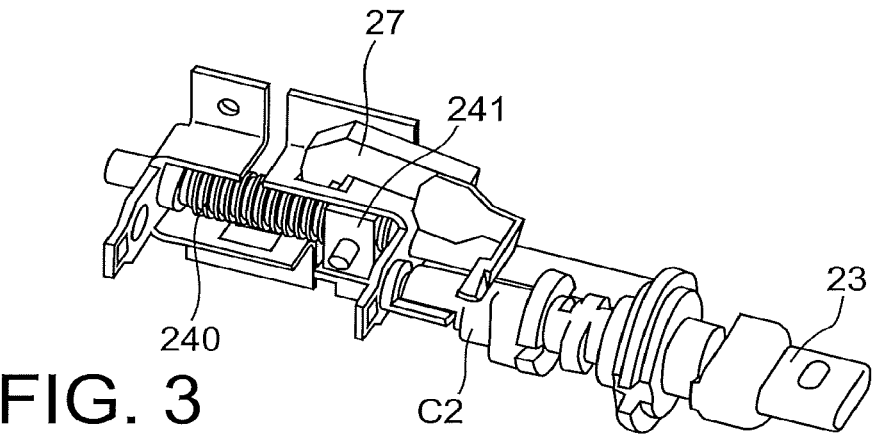
FIG. 3 represents a further perspective view of elements of the operating mode selector which are employed for the deployment of the locked closed mode, according to one form of embodiment of the present invention.

FIG. 3 represents a further perspective view of elements of the operating mode selector, which are employed for the deployment of the locked closed mode.

The system of cams C specifically comprises a cam C2. When the button 23 is in the "locked closed" position, the cam C2 drives a locking organ 27, which is preferably a rotating catch, pivoting around a shaft. One end of the locking organ 27 then mechanically blocks the nut 241, which is no longer able to move on the worm screw 240. The motor of the earthing switch 1 is thus mechanically blocked.

Thus, when the locked closed mode is selected via the button 23, for example prior to the execution of a manual operation on high-voltage cables, the earthing switch 1 remains securely closed, even under the circumstance where the electrical command function of the earthing switch is short-circuited. Such a case may occur if the auxiliary contacts 50 are fused as a result of the passage of an excessively high current. In the absence of the mechanical locking of the cam C2, the start-up of the electric motor would then be possible in response to a remote command for the opening of the earthing switch, thereby endangering an operator working on the high-voltage cables. By means of the invention, the rotation of the motor is mechanically blocked by the cam C2, the earthing switch remains closed, and the safety of operating personnel is preserved.

Figure 4:
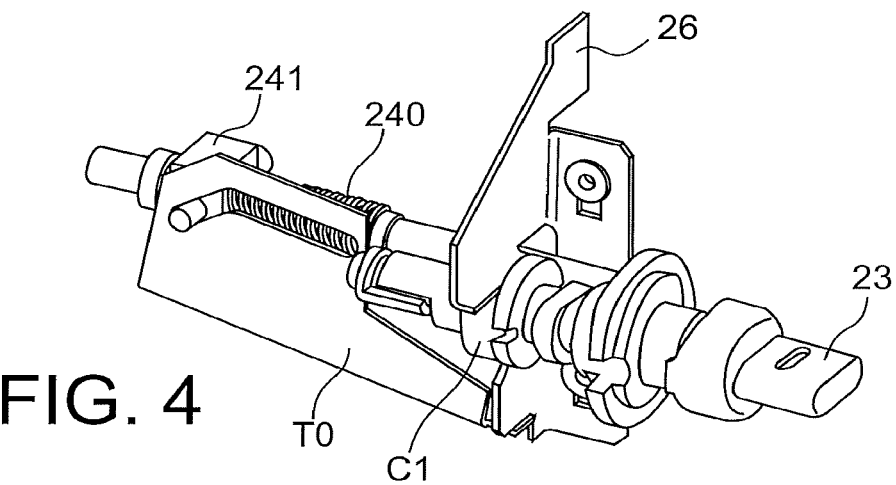
FIG. 4 represents a further perspective view of elements of the operating mode selector, relating to the interlocking system of the switch and the circuit-breaker, according to one form of embodiment of the present invention.

FIG. 4 represents a further perspective view of elements of the operating mode selector, employed for the deployment of the automatic mode and the manual mode, specifically for the manual interlocking operations of the earthing switch and the circuit-breaker truck.

To close the earthing switch, the circuit-breaker truck must be unplugged beforehand, then maintained locked in this position for such time as the switch is closed. Conversely, to plug in the circuit-breaker truck, the switch must be opened beforehand, then maintained locked in this position for such time as the circuit-breaker truck does not resume the unplugged position.

As mentioned above, the motor 24 is designed for the rotary drive of the worm screw 240, upon which the nut 241 moves in translation when the worm screw is driven by the motor. This causes the movement of the power contacts 10 of the earthing switch 1.

A first lever T0 is driven by the nut 241, such that the lever T0 acts on the locking organ 26, which is a translationally moveable rod. The rod 26 mechanically blocks the circuit-breaker truck (not represented) in the unplugged position, when the nut 241 moves towards the closed position of the switch.

Thus, in automatic mode, the closing of the earthing switch 1 ensures the mechanical blocking of the circuit-breaker truck, thereby preventing the manual actuation of the circuit-breaker truck, and the plugging-in of the circuit-breaker. In the absence of the first lever T0, an operator would be able to plug-in the circuit-breaker truck manually, following the remote electrical closing of the earthing switch. Due to the invention, this situation cannot occur.

When the button 23 is in the manual mode position, a second cam C1 of the selector directly drives the rod 26 which mechanically blocks the circuit-breaker truck in the unplugged position. The manual plugging-in of the circuit-breaker truck is thus prevented.

Conversely, if the circuit-breaker truck is in the plugged-in position, the rod 26 is blocked in the lower position by the truck. The cam C1 is blocked in turn, thus preventing the switching of the button 23 to manual mode. The cam C8 prevents the insertion of the crank wheel in its socket. The manual closing of the switch is thus impossible.

Figure 5:
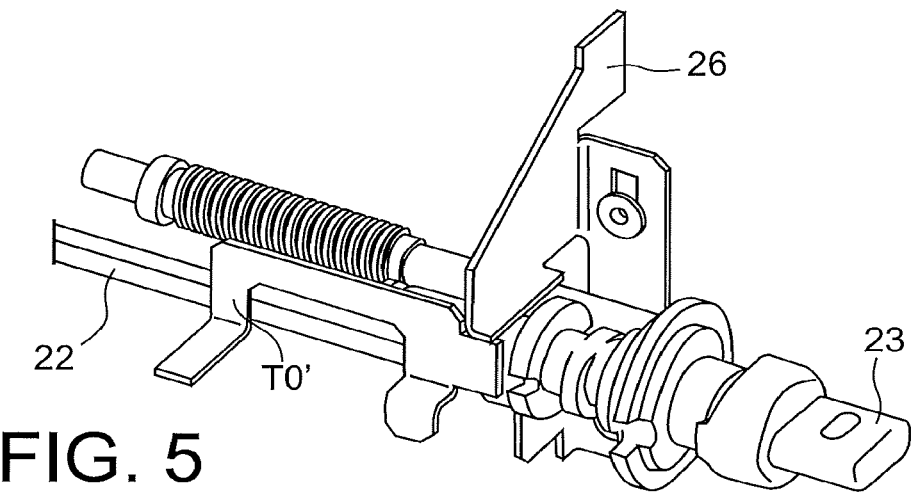
FIG. 5 represents a further perspective view of elements of the operating mode selector, which are employed in the event of the failure of the power contacts or the control shaft, according to one form of embodiment of the present invention.

FIG. 5 represents a further perspective view of elements of the operating mode selector, which are employed in the event of the failure of the power contacts 10.

The status feedback shaft 22 assumes a longitudinal position which indicates the actual position of the power contacts 10 of the earthing switch. The status feedback shaft 22 specifically indicates whether the power contacts 10 of the earthing switch 1 are closed.

If the power contacts 10 of the earthing switch remain fused in the closed position, for example as a result of the passage of an excessive current during multiple closing operations under fault conditions, and if a command for the opening of the earthing switch is transmitted, the status feedback shaft 22 will remain in place, and maintains a second lever T0' in position against the rod 26. The second lever thus maintains the rod 26 in a position of mechanical blocking of the circuit-breaker truck (unplugged position). Due to the invention, the manual plugging-in of the circuit-breaker truck is thus impossible.

Figure 6A:
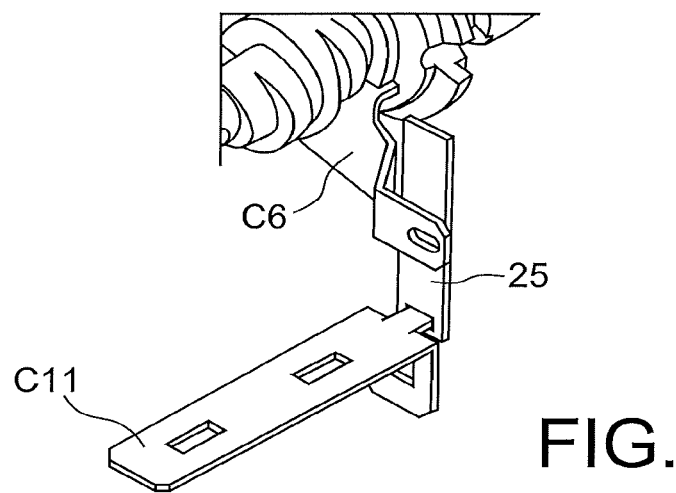
FIGS. 6a and 6b represent further perspective views of elements of the operating mode selector, relating to the interlocking system of the switch and an access door to the high voltage cables of the cubicle, according to one form of embodiment of the present invention.
Figure 6B:
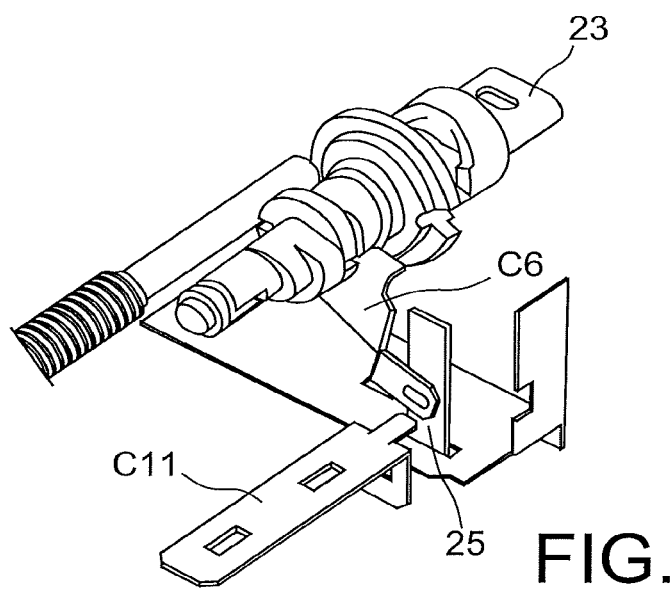

FIGS. 6a and 6b represent further perspective views of elements of the operating mode selector, which are employed for the locking of the access door to the compartment in which the high-voltage cables of the cubicle are accommodated.

The system of cams C comprises a cam C6 which acts on the locking organ 25. In the form of embodiment represented, the locking organ 25 is a rod, the movement of which, in this case vertical, permits the locking of the access door to the high-voltage cables, situated below the switch in the example described.

The door is locked in all modes, except for the "locked closed" mode of the switch. In this mode, manual intervention on the high-voltage cables is permitted. In this case, the opening of the door releases a spring-mounted rod C11, which blocks the rod 25 in its upper position. The button 23 is thus blocked in the "locked closed" position of the switch, thereby preventing the opening of the switch for such time as the access door to the cables is not closed again.

Conversely, the closing of the door moves the rod C11 and releases the rod 25, and thereafter the cam C6, thus permitting the rotation of the button 23 and the transition to "manual mode" or "automatic mode" for the opening of the earthing switch.

There is a particular instance of the conduct of operations on cables during which it is necessary to open the earthing switch in order to inject a test voltage into the cables, with the door open. In this specific case, it is possible to execute a manual action on the rod C11 in order to simulate the closing of the door, releasing the rod 25 and the cam C6, before switching to manual mode or automatic mode and opening the earthing switch. At the end of the test, the switch is closed, and initial conditions are restored.

Figure 7A:
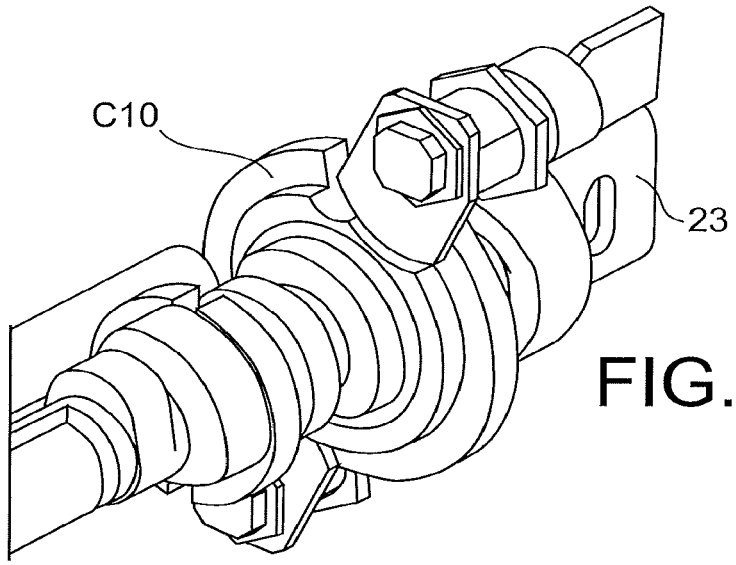
FIGS. 7a, 7b and 7c represent further perspective views of elements of the operating mode selector, relating to lock-out modes, according to one form of embodiment of the present invention.
Figure 7B:
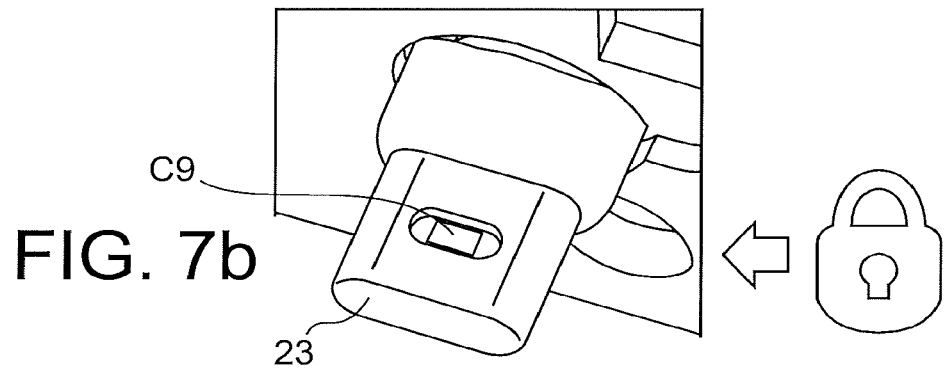
Figure 7C:
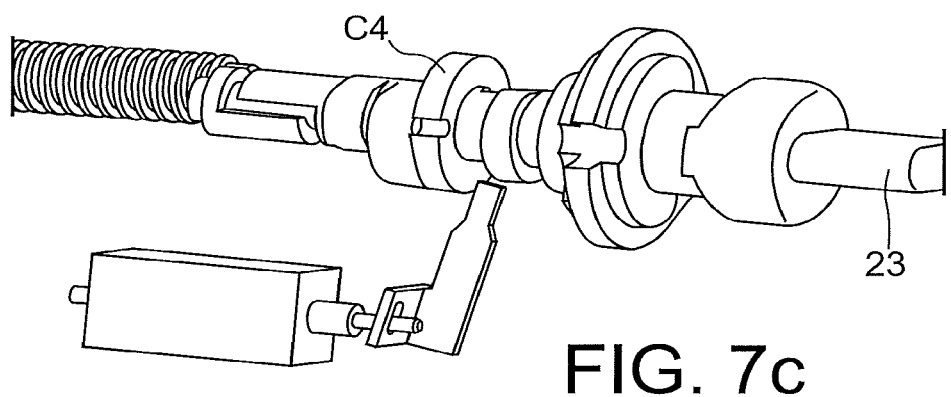

FIGS. 7a, 7b and 7c represent further perspective views of elements of the operating mode selector, which are employed for the lock-out of the earthing switch.

The system of cams C comprises a cam C10 which interacts with key-operated locks, preventing the rotation of the button 23 where the latter is in the "locked open" and "locked closed" positions, thus permitting the lock-out of the earthing switch, or the interlocking thereof with an up-circuit or down-circuit device.

In a similar manner, the system of cams C comprises a cam C9 which interacts with a padlock, preventing the rotation of the button 23 where the latter is in the "locked open" and "locked closed" positions, thus permitting the lock-out of the earthing switch.

In a similar manner, the system of cams C comprises a cam C4 which interacts with an electric coil, preventing the rotation of the button 23 where the latter is in the "locked open" and "locked closed" positions, thus permitting the lock-out of the earthing switch.

The invention claimed is:

1. An operating mode selector of an earthing switch, the earthing switch comprising power contacts and a motor to actuate the power contacts, the selector comprising:
   a plurality of positions, corresponding respectively to different operating modes of the earthing switch, and comprising cams, the positions of which are defined by the position of the selector;
   a status feedback shaft configured to detect a position of the power contacts of the earthing switch and to move in translation to convey the position of the power contacts of the earthing switch to the selector;

a position indicator disposed on an outer surface of the selector and configured to permit viewing of the position of the power contacts conveyed to the selector by the status feedback shaft;

a worm screw which is driven in rotation by the motor and a nut which is driven by the worm screw when the motor drives said worm screw, wherein the nut is connected to a control shaft to initiate a movement of the power contacts of the earthing switch; and a first lever which is driven by the nut of the worm screw, such that the first lever acts on a second locking organ in an unplugged position when the nut moves to the closed position of the earthing switch, where the selector is in a position, of the plurality of positions, corresponding to an automatic mode, in which the earthing switch is actuated by the motor, wherein the selector comprises a first cam which drives a first locking organ, which is designed to mechanically block the motor of the earthing switch when the selector is in a position, of the plurality of positions, which corresponds to a locked closed mode, when the earthing switch is closed.

2. The operating mode selector according to claim 1, further comprising:

a third cam which acts on auxiliary electrical contacts in order to establish an electric power supply to the motor in automatic mode, and to interrupt the electric power supply to the motor in other modes.

3. The operating mode selector according to claim 1, comprising:

a fourth cam acting on a third locking organ.

4. The operating mode selector according to claim 3, further comprising:

a rod which blocks the selector in the locked closed mode.

5. The operating mode selector according to claim 1, further comprising:

a fifth cam and a status feedback shaft for the position of the power contacts, in order to prohibit access to a locked open mode, in which the earthing switch is open, and to the locked closed mode, if a corresponding position of the power contacts of the earthing switch is not achieved.

6. The operating mode selector according to claim 1, further comprising:

padlock blocking system, in the locked closed and locked open modes of the earthing switch.

7. The operating mode selector according to claim 1, where the control shaft is attached to the nut.

8. An operating mode selector of an earthing switch, the earthing switch comprising power contacts and a motor to actuate the power contacts, the selector comprising:

a plurality of positions, corresponding respectively to different operating modes of the earthing switch, and comprising cams, the positions of which are defined by the position of the selector;

a worm screw which is driven in rotation by the motor and a nut which is driven by the worm screw when the motor drives said worm screw, wherein the nut is connected to a control shaft to initiate a movement of the power contacts of the earthing switch; and a first lever which is driven by the nut of the worm screw, such that the first lever acts on a second locking organ in an unplugged position when the nut moves to the closed position of the earthing switch, where the selector is in a position, of the plurality of positions, corresponding to an automatic mode, in which the earthing switch is actuated by the motor, wherein the selector comprises a first cam which drives a first locking organ, which is designed to mechanically block the motor of the earthing switch when the selector is in a position, of the plurality of positions, which corresponds to a locked closed mode, when the earthing switch is closed.

\* \* \* \* \*